United States Patent
O'Brien, Jr. et al.

(10) Patent No.: US 9,110,862 B1
(45) Date of Patent: Aug. 18, 2015

(54) SYSTEM AND METHOD OF USE FOR NON-PARAMETRIC CIRCULAR AUTOCORRELATION FOR SIGNAL PROCESSING

(75) Inventors: Francis J. O'Brien, Jr., Newport, RI (US); Nathan Johnnie, Middletown, RI (US); Aimee M. Ross, New Bedford, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 552 days.

(21) Appl. No.: 13/561,178

(22) Filed: Jul. 30, 2012

(51) Int. Cl.
- *G06F 17/18* (2006.01)
- *G06F 19/00* (2011.01)
- *G06K 9/00* (2006.01)
- *G06K 9/40* (2006.01)
- *G01S 7/539* (2006.01)

(52) U.S. Cl.
CPC .............. *G06F 17/18* (2013.01); *G06K 9/0051* (2013.01); *G06K 9/40* (2013.01); *G01S 7/539* (2013.01)

(58) Field of Classification Search
CPC ....... G01S 7/539; G06F 17/18; G06K 9/0051; G06K 9/40
USPC .................. 702/143, 179, 181, 189; 367/135; 375/346
See application file for complete search history.

(56) References Cited

U.S. PATENT DOCUMENTS 8,693,288 B1 * 4/2014 O'Brien et al. ............... 367/135

OTHER PUBLICATIONS

Wald, A. and J. Wolfowitz, An exact test for randomness in the non-Parametric case based on serial correlation, Annals of Mathematical Statistics vol. 14, No. 4, pp. 378-388, 1943.

* cited by examiner

Primary Examiner — John H Le
(74) Attorney, Agent, or Firm — James M. Kasischke; Michael P. Stanley

(57) ABSTRACT

A computer-implemented method to characterize a signal structure is provided. The method may receive a first set of time-dependent data vectors; select a sample size of data vectors; determine a minimum number of lags to process to characterize the first set of data vectors; calculate a cross-product term for each data vector in the sample size for each lag, a mean value and a variance value based on the sum of the cross-product term for each lag; calculate a circular correlation function for each lag; determine an upper and a lower correlation bound for the circular correlation based on the mean value, the variance value, and a desired false alarm rate; and characterize the signal structure based on the number of calculated circular correlation functions that exceed the upper or lower correlation bounds so as to generate a signal characterization data signal.

23 Claims, 9 Drawing Sheets

| i | $x_i$ | $x_{i+1}$ | $R_1=$ $x_i \cdot x_{i+1}$ | $x_i^2$ | $x_i^3$ | $x_i^4$ |
|---|---|---|---|---|---|---|
| 1 | 45 | 41 | 1,845 | 2,025 | 91,125 | 4,100,625 |
| 2 | 41 | 50 | 2,050 | 1,681 | 68,921 | 2,825,761 |
| 3 | 50 | 41 | 2,050 | 2,500 | 125,000 | 6,250,000 |
| 4 | 41 | 59 | 2,419 | 1,681 | 68,921 | 2,825,761 |
| 5 | 59 | 57 | 3,363 | 3,481 | 205,379 | 12,117,361 |
| 6 | 57 | 56 | 3,192 | 3,249 | 185,193 | 10,556,001 |
| 7 | 56 | 47 | 2,632 | 3,136 | 175,616 | 9,834,496 |
| 8 | 47 | 40 | 1,880 | 2,209 | 103,823 | 4,879,681 |
| 9 | 40 | 42 | 1,680 | 1,600 | 64,000 | 2,560,000 |
| 10 | 42 | 54 | 2,268 | 1,764 | 74,088 | 3,111,696 |
| 11 | 54 | 44 | 2,376 | 2,916 | 157,464 | 8,503,056 |
| 12 | 44 | 49 | 2,156 | 1,936 | 85,184 | 3,748,096 |
| 13 | 49 | 52 | 2,548 | 2,401 | 117,649 | 5,764,801 |
| 14 | 52 | 53 | 2,756 | 2,704 | 140,608 | 7,311,616 |
| 15 | 53 | 45=$x_i$ | 2,385 | 2,809 | 148,877 | 7,890,481 |
| SUM | 730 | 730 | 35,600 | 36,092 | 1,811,848 | 92,279,432 |
|  | $S_1$ | $S_1$ | $R_1$ | $S_2$ | $S_3$ | $S_4$ |

FIG. 2

| LAG h | MEASURE | | | |
|---|---|---|---|---|
| | $R_h$ | $R_{x,x+h}$ | $\tau$ | $p$ |
| 1 | 35,600 | 0.13 | 0.80 | 0.42 |
| 2 | 35,467 | -0.11 | -0.14 | 0.89 |
| 3 | 35,298 | -0.40 | -1.33 | 0.18 |
| 4 | 35,333 | -0.34 | -1.08 | 0.28 |
| 5 | 35,423 | -0.18 | -0.45 | 0.65 |
| 6 | 35,573 | 0.08 | 0.61 | 0.54 |
| 7 | 35,710 | 0.32 | 1.58 | 0.11 |
| 8 | ALL DATA SAME AS LAG 7 | | | |
| 9 | ALL DATA SAME AS LAG 6 | | | |
| 10 | ALL DATA SAME AS LAG 5 | | | |
| 11 | ALL DATA SAME AS LAG 4 | | | |
| 12 | ALL DATA SAME AS LAG 3 | | | |
| 13 | ALL DATA SAME AS LAG 2 | | | |
| 14 | ALL DATA SAME AS LAG 1 | | | |

FIG. 3

| SAMPLE SIZE $n$ | MINIMUM $h$ | MATLAB™ $\max_h=\min[20,n-1]$ |
|---|---|---|
| 4 | 2 | 3 |
| 5 | 2 | 4 |
| 10 | 5 | 9 |
| 15 | 7 | 14 |
| 20 | 10 | 19 |
| 25 | 12 | 20 |
| 30 | 15 | 20 |
| 35 | 17 | 20 |
| 40 | 20 | 20 |
| 45 | 22 | 20 |
| 50 | 25 | 20 |
| 55 | 27 | 20 |
| 100 | 50 | 20 |
| $n \to \infty$ | BASED ON A RANDOM SAMPLE | BASED ON A RANDOM SAMPLE |
| $n$ ODD | ⎯⎯ | $\min[20,n-1]$ |
| $n$ EVEN | — | $\min[20,n-1]$ |
| OVERALL, $\min_h$ | ⎯⎯ | — |

FIG. 7

SYSTEM AND METHOD OF USE FOR NON-PARAMETRIC CIRCULAR AUTOCORRELATION FOR SIGNAL PROCESSING

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention generally relates to a signal processing system and more particularly, but not by way of limitation, to a system and method of use for non-parametric circular autocorrelation for signal processing.

(2) Description of the Prior Art

In signal processing studies four important functions may be used to describe or model a finite stationary signal $x(t), t \geq 0$ whether it be periodic, transient or random, or based on a single source or multiple sources (an ensemble) of input data. These functions are the mean square value, probability density function (PDF), autocorrelation function (ACF) and power spectral density (PSD).

Autocorrelation is generally the cross-correlation of a signal with itself. It describes the dependence of a signal's value at one point with the value of the same signal at another time. The measure is designed to detect repeating patterns or trends in noise-corrupted nonlinear time series distributions (e.g., periodic, quasi-periodic, parabolic, etc.) and identify frequencies. The ACF is one measure to determine whether the time waveform is random noise. The ACF is a basic building block of time series analysis. It has applications to diverse fields including signal processing, oceanography, astrophysics, finance & economics, quality control, physiology, epidemiology, demography, statistics and other applied areas of science and engineering.

The ACF is generally defined as:

$$R(\tau) = \frac{E[(X_t - \mu)(X_{t+\tau} - \mu)]}{\sigma^2}, \quad -1 \leq R(\tau) \leq +1 \quad (1)$$

where E is the expected value operator, t is the discrete or continuous variable time, $\tau$ is the time lag, $\mu$ is the mean, $\sigma^2$ is the variance. $\sigma^2$ and $\mu$ are time independent.

Various modifications are made to this formula depending upon the measurements (discrete or continuous) and other assumptions relating to stationarity, ergodicity, etc. For instance, in naval sonar signal processing with positive time t the definition of the ACF used for analysis of stationary random signals $x(t), t \geq 0$, takes the time average limiting form, $$R_{xx}(\tau) = \lim_{T \to \infty} \frac{1}{T} \int_0^T X(t)x(t+\tau)\,dt \quad (1a)$$

when the process is assumed to be ergodic-defined in one way as a positive recurrent aperiodic state of stochastic systems, or tending in probability to a limiting form that is independent of the initial conditions—a condition usually encountered in sonar signal studies.

The autocorrelation function (discrete or continuous time models) has certain basic properties. The autocorrelation function is a symmetric around 0 (or an even function for continuous case), $R(\tau) = R(-\tau)$. The autocorrelation function will have its largest value at the origin, when time lag $\tau = 0$; $R(0) \geq R(\tau)$. The autocorrelation of a periodic function will also be periodic with the same frequency. Other properties, well known to those skilled in the art, also exist. In addition, specific types of noise such as white and colored noise, and functional forms have documented characteristics.

With respect to circular correlation, the normalized circular autocorrelation function for a discrete time process can be described as arising from the classical Pearson linear correlation function for a data set consisting of n bivariate pairs $x_1y_1, x_2y_2, \ldots x_ny_n$. The linear correlation r for samples of size n can be expressed as a definition:

$$r_{x,y} = \frac{\frac{1}{n-1}\sum_{i=1}^{n}(x_i - \bar{x})(y_i - \bar{y})}{\sqrt{\left(\frac{1}{n-1}\sum_{i=1}^{n}(x_i - \bar{x})^2\right)\left(\frac{1}{n-1}\sum_{i=1}^{n}(y_i - \bar{y})^2\right)}}, \quad (2)$$

$$-1 \leq r_{x,y} \leq +1$$

This definition of can be simplified to a well-known computing formula:

$$r_{x,y} = \frac{\sum_{i=1}^{n} x_i y_i - \dfrac{\sum_{i=1}^{n} x_i \sum_{i=1}^{n} y_i}{n}}{\sqrt{\left(\sum_{i=1}^{n} x_i^2 - \dfrac{\left(\sum_{i=1}^{n} x_i\right)^2}{n}\right)\left(\sum_{i=1}^{n} y_i^2 - \dfrac{\left(\sum_{i=1}^{n} y_i\right)^2}{n}\right)}} \quad (3)$$

where $\bar{x}$ and $\bar{y}$ are arithmetic means.

The circular normalized $\pm 1$ correlation coefficient is derived from index $r_{x,y}$ by a structured process that systematically recycles the input observations $x_1y_1, x_2y_2, \ldots x_ny_n$ in circular fashion of varying lag-length h. That is, each vector of lagged data contains the same measurements structured in a circular pattern. For the first lag set $$\sum_{i=1}^{n} x_i = \sum_{i=1}^{n} y_i$$

and $$\sum_{i=1}^{n} x_i^2 = \sum_{i=1}^{n} y_i^2,$$

substitute $x_{i-1}$ for $y_i$ and, for the last pair, put $x_1$ for $x_{n+1}$ in formula (3) above to render the 1-lag circular correlation index, $$R_{x,x+1} = \frac{\sum_{i=1}^{n-1} x_i x_{i+1} + x_n x_1 - \frac{\left(\sum_{i=1}^{n} x_i\right)^2}{n}}{\sum_{i=1}^{n} x_i^2 - \frac{\left(\sum_{i=1}^{n} x_i\right)^2}{n}}, -1 \leq R \leq +1 \quad (4)$$

Wald, A. and J. Wolfowitz, *An exact test for randomness in the non-Parametric case based on serial correlation*, Annals of Mathematical Statistics Vol. 14, No. 4, pages 378-388, 1943, (hereinafter "Wald and Wolfowitz") provides a non-parametric permutations method such that if n is sufficiently large the 1-lag correlation of formula (4) above can be tested to determine if the distribution is random based on the statistic, $$\sum_{i=1}^{n-1} x_i x_{i+1} + x_n x_1.$$

Some researchers suggest that n>75 is required for the theoretical assumptions of the test to be valid (Giles, S., *Random-noise filter based on circular correlation*, Southeastern Symposium Systems Theory, 2009. http://ieeexplore.ieee.org/stamp/stamp.jsp?arnumber=04806850; hereinafter "Giles") while others suggest n≥50 (Kay, S. M. and L. Pakula, *Detection performance of the circular correlation coefficient receiver*. IEEE Transactions on Acoustics, Speech, and Signal Processing, Vol. ASSP-34, no. 3, June 1986, pages 399-404. Hereinafter "Kay et al.") but many standard textbooks place a lower bound of 25. In accordance with the present disclosure, 25 may be selected as the minimum although truly random samples even as small as 15 can be detected for pure noise. This is a novel and efficient idea. Non-circular autocorrelation methods, which typically assume a Gaussian distribution, often analyze many more lags before a decision of "signal" or "noise" is made.

In a similar fashion, to obtain the autocorrelation for an arbitrary lag of length h, the circular index can be calculated by the derived formula:

$$R_{x,x+h} = \frac{\sum_{i=1}^{n-h} x_i x_{i+h} + \sum_{i=1}^{h} x_{i+n-h} x_i - \frac{\left(\sum_{i=1}^{n} x_i\right)^2}{n}}{\sum_{i=1}^{n} x_i^2 - \frac{\left(\sum_{i=1}^{n} x_i\right)^2}{n}}, \quad (5)$$

$$-1 \leq R_{x,x+h} \leq +1; 0 \leq h \leq n-1.$$

Application of the non-circular form of equation (5) omits the second term of $$\sum_{i=1}^{n-h} x_i x_{i+h} + \sum_{i=1}^{h} x_{i+n-h} x_i.$$

In some aspects, the same identical n data points are used in a wrap-around circular fashion for any lag in the computation of the ACF. The standard discrete non-circular correlation index removes one observation with each lag calculation, a serious drawback for small samples, a condition for which the present disclosure models accurately and efficiently.

Wald and Wolfowitz generally describe the properties of $R_{x,x+h}$ in the context of non-parametric (or distribution free) methods. To summarize the large sample non-parametric approach of Wald and Wolfowitz at page 378 provide:

a sequence of variates $x_1, \ldots, x_N$ is said to be a random series, or to satisfy the condition of randomness, if $x_1, \ldots, x_N$ are independently distributed; i.e., if the joint cumulative distribution function (c.d.f.) of $x_1, \ldots, x_N$ is given by the product $F(x_1) \ldots F(x_N)$ where $F(x)$ may be any c.d.f.

This method has been adapted for application in signal processing studies of random signals to determine if the distribution is random and to document other properties of the signal structure such as periodicities or other trends. The underlying distribution function may be continuous or discrete.

Further, a number of prior art references address various aspects of signal processing methodologies/techniques. For example, U.S. Pat. No. 7,369,961, to Castelli et al., relates to clustering structures of time sequences. Generally, the Castelli et al. patent discloses a system and method to discover potential periodicities of time series by examining power spectral density (PSD) and circular autocorrelation functions (ACFs). Their ACF formula is designed to "estimate dominant periods of a time series." (Col. 4, lines 55-56). The present disclosure, however, uses an entirely different circular autocorrelation function and addresses a different purpose.

Other prior art references include, for example, U.S. Pat. Nos. 5,966,414 and 6,597,634, to O'Brien et al. (of the present disclosure). These patents generally relate to methods for distinguishing signal from noise in time-series data. However, these patents do not teach or suggest the present disclosure. For example, these patents can be distinguished in the dimensionality analyzed, the ensemble of statistical and probability methods for data analysis. Neither patent uses a circular autocorrelation method for signal/noise determination.

In view of the above, there is a need for an improved system on non-parametric circular autocorrelation for signal processing and method of use, such as is described in the present disclosure.

SUMMARY OF THE INVENTION

Accordingly, it is an object of the present invention to provide an improved computer-aided means to detect a random process and characterize signal structure in a two-dimensional time-series or other in situ distributions. The present disclosure, in some aspects, comprises an improved system and method to compute the one-dimensional, normalized, circular autocorrelation function in the analysis of synthetic or real signals when the distribution is unknown (Gaussian or non-Gaussian). The present disclosure presents a logical alternative to commonly available autocorrelation procedures such as provided by MATLAB™ and other data processing software systems including R, S+, SAS™, SPSS, Scilab, and the like. One characteristic of the present disclosure is the capability to provide the described functionality while handling moderately small data sets.

The operation of the present disclosure may be structured to be as flexible as possible with multiple uses in mind, according to the philosophy that, in a black box real time operating system of inputs, it is judicious to examine the entire autocorrelation function for indications of randomness or trends (linear, nonlinear, and periodic). Analysis of a single lag can at most be a test of randomness in a time series; however, a single lag cannot detect periodic or quasi-periodic structure embedded in noise for a time limited or varying waveform. Thus, the inventive method herein disclosed is as general as possible allowing the user wide discretion and flexibility as to the uses to which the invention can be of service in military and commercial settings.

In some aspects, the present disclosure may not be designed to distinguish random noise from deterministic noise although properties of the non-circular ACF have been documented in the case of strange attractors, and are well known to those skilled in the art. Rather, the inventive method is designed, by way of example, to distinguish noise-corrupted signals from randomness (the absence of quantifiable useful signal information) regardless of the origination of the noise.

With the above and other objects in view, a feature of the present disclosure is the provision of a computer-implemented method to characterize a signal structure. The method may comprise receiving, via a first data channel, a first set of time-dependent data vectors. Each of the data vectors may have an associated amplitude. The method may further comprise activating a signal characterization module that executes instructions. When executed, the instructions may cause the signal characterization module to: select a sample size of data vectors from the first set of data vectors; determine a minimum number of lags to process to characterize the first set of data vectors based on the sample size from the first set; calculate a cross-product term for each data vector in the sample size for each lag, a mean value based on the sum of the cross-product term for each lag, and a variance value based on the sum of the cross-product term for each lag; calculate a circular correlation function for each lag; determine an upper and a lower correlation bound for the circular correlation based on the mean value, the variance value, and a desired false alarm rate; and characterize the signal structure based on the number of calculated circular correlation functions that exceed the upper or lower correlation bounds so as to generate a signal characterization data signal. Lastly, the method may further comprise providing the signal characterization data signal on a second data channel.

In accordance with a further feature of the present disclosure, there is provided a signal structure characterization system. The system may comprise a first data channel configured to receive a first set of time-dependent data vectors, each data vector having an associated amplitude. The system may further comprise a processing system configured to read the first set of time-dependent data vectors and store the first set in a memory. The processing system may further comprise a signal characterization module configured to execute instructions that, when executed, causes the processing system to: select a sample size of data vectors from the first set of data vectors; determine a minimum number of lags to process to characterize the first set of data vectors based on the sample size from the first set; calculate a cross-product term for each data vector in the sample size for each lag, a mean value based on the sum of the cross-product term for each lag, and a variance value based on the sum of the cross-product term for each lag; calculate a circular correlation function for each lag; determine an upper and a lower correlation bound for the circular correlation based on the mean value, the variance value, and a desired false alarm rate; and characterize the signal structure based on the number of calculated circular correlation functions that exceed the upper or lower correlation bounds so as to generate a signal characterization data signal. The system may even further comprise a second data channel configured to output the signal characterization data signal.

In accordance with a still further feature of the present disclosure, there is provided a computer-implemented method to characterize a first set of time-dependent data vectors to identify one or more of a signal component or a noise component. The method may comprise receiving, via a first data channel, a first set of time-dependent data vectors, each data vector having an associated amplitude. The method may comprise selecting a sample size of data vectors from the first set of data vectors. The method may comprise determining a minimum number of lags to process to characterize the first set of data vectors based on the sample size from the first set. The method may further comprises calculating a cross-product term for each data vector in the sample size for each lag, a mean value based on the sum of the cross-product term for each lag, and a variance value based on the sum of the cross-product term for each lag. The method comprises calculating a circular correlation function for each of the determined minimum number of lags and determining an upper and a lower correlation bound for the circular correlation. The method may further comprise characterizing the signal structure based on the number of calculated circular correlation functions that exceed the upper or lower correlation bounds so as to generate a signal characterization data signal. Lastly, the method may even further comprise providing, via a second data channel, the signal characterization data signal.

Other objects, features, and advantages of the present invention will be apparent to those having ordinary skill in the art reading the instant specification, drawings, and appended claims.

BRIEF DESCRIPTION OF THE DRAWINGS

FIG. 2 is a table showing the random series and summary statistics derived from the exemplary data set presented in the table of FIG. 1;

FIG. 3 is a table illustrating a complete analysis of the data for the maximum number of lags permissible, in accordance with the present disclosure;

FIG. 7 is an exemplary table showing the minimum number of lags for varying sample sizes, in accordance with certain aspects of the present disclosure;

DETAILED DESCRIPTION OF THE INVENTION

Figure 1:
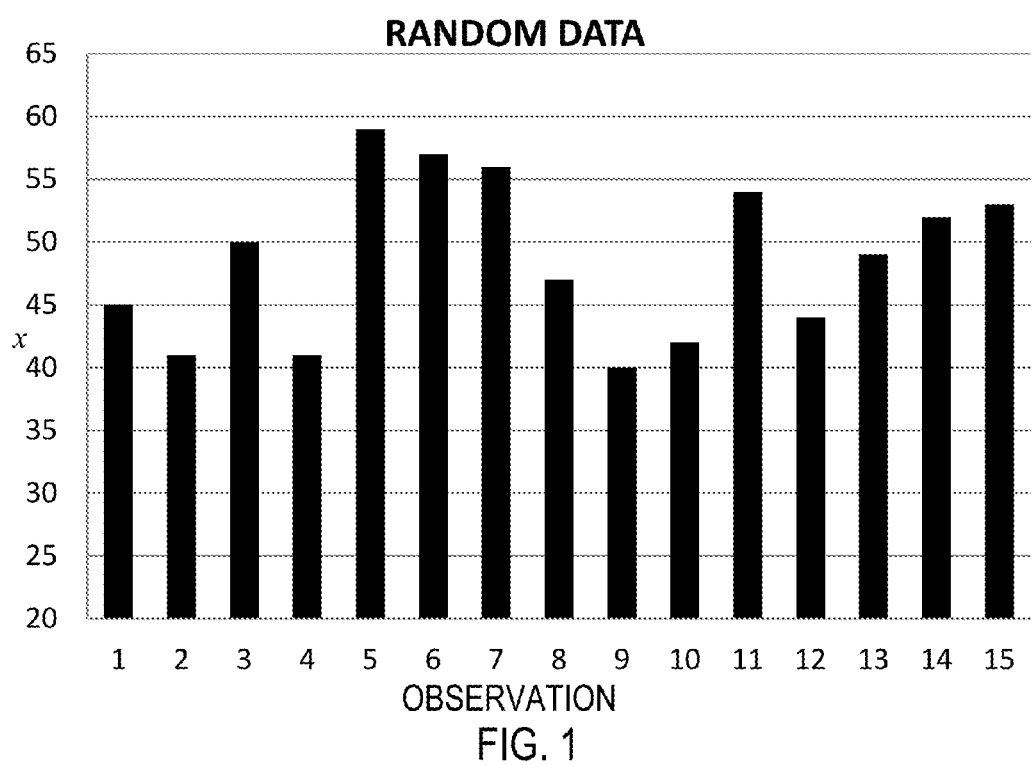
FIG. 1 is a table including a random data set used to illustrate certain aspects of the present disclosure.

Before explaining the presently disclosed and claimed inventive concepts in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary, not exhaustive. It is to be understood that the phraseology and terminology employed herein is for the purpose of description and should not be regarded as limiting. Unless otherwise required by context, singular terms may include pluralities and plural terms may include the singular.

To provide exemplary illustrations of certain aspects of the present disclosure, assume a data set containing measurements of a finite number of independent data points or vectors $x_1, x_2, \ldots, x_n$ of a time series. The non-parametric circular serial correlation (or autocorrelation) derived by Wald and Wolfowitz is an exact test of serial randomness in a sample in the time domain. The distributional structure of the data or underlying population from which the sample is drawn is assumed unknown. The statistic for a lag of length h, $$R_h = \sum_{i=1}^{n-h} x_i x_{i+h} + \sum_{i=1}^{h} x_{i+n-h} x_i,$$

is asymptotically normally distributed. The measure $R_h$ possesses a theoretical mean and variance that can be used to test a binary hypothesis of signal-noise at the 5%, 1% or lower false alarm rate levels.

A test against $R_h$ for randomness (usually $R_1$) is equivalent to a test that the correlation $R_{x,x+h}$, (usually $R_{x,x+1}$) is random (Wald and Wolfowitz, p. 380) as well as a test that the distribution is random without further testing being required. In certain aspects, the equivalency between the two measures may be a primary theoretical basis of the present inventive method designed for non-large samples.

In accordance with certain aspects, inventive formulations are derived and documented in the present disclosure, wherein said formulations may be adapted for implementation via a computer-implemented processing system. For example, the computing correlation index of equation (5) above may be derived from the definition given by Wald and Wolfowitz (p. 378). Moreover, the present disclosure demonstrates that the discrete circular autocorrelation is symmetric with respect to the median value of the maximum lag of a discrete series on time t>0. This is different from the non-circular case in which a defining property of the ACF is symmetry about 0 on time t, $-\infty<t<+\infty$. This finding results in the option to process only one half of the time series to characterize fully the correlational structure for samples of small to moderate size—or obtain an estimate of the ACF derived from a random sample of a large sample. Overall, the inventive concepts recited in the present disclosure have found that the circular autocorrelation is a useful tool in two-dimensional space to detect and characterize a random process or signal in the time domain regardless of the underlying distribution of the data/noise (Gaussian or non-Gaussian).

For non-limiting illustration purposes, the present disclosure provides an example of the circular correlation function (circular ACF) for a quite small data set of 15 discrete observations of random data mimicking a discrete-time random process. Although this data set is less than the minimum of n=25, it is used for illustrative purposes only. We will use this data set to provide a demonstration of certain aspects of the inventive method and its application to two-dimensional time series typically encountered in signal processing and various other fields of engineering or science. It is to be understood that the present disclosure is not limited in its application to the data set discussed herein.

Referring now to the drawings, and more particularly to FIG. 1, shown therein is a table 100 including a random data set used to illustrate certain aspects of the present disclosure. Generally, the table 100 shown in FIG. 1 illustrates a small random data set (n=15) taken from Hoel, P. J. et al., Introduction to Statistical Theory, Houghton-Mifflin, Boston 1971, chap. 6 (Hereinafter "Hoel, et al."), page 180. Equations (5) through (9) generally comprise the classical approach for assessing a noise hypothesis based on 1 lag of data commonly taught in statistical texts provided the sample size is large enough; e.g., Hoel et al., p. 178. This example demonstrates that the method detects randomness for n of 15. For this procedure, the simple binary hypothesis set is:

$H_0: R=0$ (noise)

$H_1: R\neq 0$ (signal+noise)

FIG. 2 is a table showing the random series and summary statistics derived from the exemplary data set presented in the table 100 of FIG. 1. That is, the data presented in FIG. 2 shows the real variable discrete circular correlation for one-lag wherein n=15. The input data of FIG. 2 are labeled $x_i$ and generally correspond to the data vectors presented in the data set of FIG. 1. Using alternative notation, the first-lag autocorrelation computed by equation (5), with h set to 1 is:

$$R_{x,x+1} = \frac{\sum_{i=1}^{n-1=14} x_i x_{i+1} + x_n x_1 - \left[\frac{\left(\sum_{i=1}^{n=15} x_i\right)^2}{n}\right]}{\sum_{i=1}^{n=15} x_i^2 - \left[\frac{\left(\sum_{i=1}^{n=15} x_i\right)^2}{n}\right]} = \frac{R_1 - \frac{S_1^2}{n}}{S_2 - \frac{S_1^2}{n}} = +.13. \quad (6)$$

The values are constants carried across all h-lag correlations; only $R_h = R_1, R_2, \ldots, R_{n-1}$ varies in the calculation of $R_{x,x+h}$. To determine if the 1-lag correlation is "signal" or "noise," Wald and Wolfowitz's method tests the statistic, $R_1=35600$, for randomness in a permutation Central Limit Theorem normal approximation test, a procedure identical to testing the correlation value +0.13 for randomness. A determination of $R_1$ being "signal" or "noise" carries the same determination for the correlation index, $R_{x,x+1}$. With such a small sample size, it is unlikely that the asymptotic conditions are met to render a valid use of the Wald-Wolfowitz circular correlation permutation method.

Wald and Wolfowitz, pages 381-383 provides that the product-measure R (of col. 3) has the theoretical properties:

$$\text{mean} = \mu = E(R)\frac{S_1^2 - S_2}{n-1} = \frac{(730)^2 - 36092}{14} = 35486.29 \quad (7)$$

$$\text{variance} = \sigma^2 = \text{var}(R) = \quad (8)$$

$$\frac{S_2^2 - S_4}{n-1} + \frac{S_1^4 - 4S_1^2 S_2 + 4S_1 S_3 + S_2^2 - 2S_4}{(n-1)(n-2)} - [E(R)]^2 = 20020.51$$

[Note that, for equation (7), the $E(R) \cong R_1$; i.e., $35486.29 \cong 35600$.] This is as expected because the data are random (noise). Also note that, with regards to equation (8), $$S_1^2 = (S_1)^2 = \left(\sum_{i=1}^{n} x_i\right)^2$$

and so with other quantities in the variance calculation, wherein $S_r = x_1^r + x_2^r + \ldots + x_2^r$ and $S_r^m = (S_r)^m$ for n>3.

Wald and Wolfowitz (pages 383 ff.) show that the following statistic $\tau$ is Gaussian ($-\infty < \tau < +\infty$; i.e., $\tau \sim N(0,1)$. To test the first lag (h=1) correlation, $R_{x,x+1} = 0.13$ for randomness, we get $$\tau_1 = \frac{R_1 - E(R)}{\sqrt{Var(R)}} = \frac{35600 - 35486.29}{\sqrt{20020.51}} = 0.80 \, (p = .42) \quad (9)$$

$R_1$ is judged "random" by this test. The conclusion is drawn that the first lag correlation, and hence the data set, is suggestive of "noise" at the $\alpha = 0.05$ false alarm rate level since $p \geq \alpha$ where the probability p is obtained from the continuous standard Gaussian (normal) distribution:

$$p = 1 - \frac{1}{\sqrt{2\pi}} \int_{-|r|}^{+|r|} \exp(-.5x^2) \, dx, \quad (10)$$

$$-\infty < |r| < +\infty, \, 0 \leq p \leq 1$$

where |●| means "absolute value" as commonly used in mathematics.

The p value is the probability of detecting noise. Another interpretation is that p represents the "belief" of the operator that the null hypothesis of random noise is true. Small values of p lead to rejection of the null hypothesis of noise only. For example, in the case of pure noise, $\tau = 0$, and $p = 1$. In the case of pure signal, $\pm|\tau| \to \pm\infty$ and $p = 0$. The calculation of p, well known to those skilled in the art, is performed in a standard finite series expansion.

The same mean $\rho = E(R)$ and variance $\sigma^2 = var(R)$ are constant terms used across all lags since they are defined for the entire sample by considering all possible permutations of the sample. The sample size n for lag h is always the same value unlike the standard non-circular correlation index which drops one observation per lag. FIG. 3 shows a table 300 illustrating a complete analysis of these data for the maximum number of lags permissible; h=n-1, i.e., a complete analysis for 14 lags (n=15) for the random data set of Hoel et al. shown in Table 100 of FIG. 1. Table 300 shows that all correlations indicate "noise" ($p \geq 0.05$) at the 5% false alarm level. The occurrence of identical results between the lower lags and upper lags will be explained below.

As noted, provided the sample size is large enough, equations (5) through (10) comprise the standard procedure for assessing a distributional noise hypothesis commonly taught in statistical texts. Interestingly, a sample as small as 15 observations-known a priori to be random—was detected to be a random series for the $n \to \infty$ asymptotic method of Wald and Wolfowitz. It is doubtful, however, that engineers would accept as valid a 1-lag test for such a small sample. More lags are needed to be certain the data does not possess hidden signal structures. In accordance with certain aspects, the presently disclosed inventive methods and system addresses this need. The inventive aspects of the present disclosure has been verified by empirical investigation based on a number of computer runs using the currently disclosed algorithm and method steps on, for example, programs that run in the MATLAB™ environment.

Researchers who have used this large sample one-lag randomness method for analysis include Giles who applied Wald and Wolfowitz's method for the removal of high frequency random noise for serial electromagnetic pulse data, and Kay et al. who investigated the complex circular correlation detector for the case of a complex sinusoidal in complex white Gaussian noise. Some refer to the statistic $R_1$ as "the correlation" but this terminology introduces confusion.

Turning now to certain inventive aspects of the present disclosure, a new method and system based on the correlations, $R_{x,x+h}$, to assess an entire ACF for a predetermined number of lags of circular data in the time domain is described. Research has shown that the methods and systems implementing the current disclosure are useful for sample sizes smaller than recommended for asymptotic theory to work. As noted, in computing the circular serial correlation for any lag h by equation (5), only the cross-product term $R_h$ changes, a computing formula for which can be expressed in summation notation as:

$$R_h = \sum_{i=1}^{n-h} x_i x_{i+h} + \sum_{i=1}^{h} x_{i+n-h} x_i = (x_1 x_{1+h} + x_2 x_{2+h} + \ldots + x_{n-h} x_n) + \quad (11)$$

$$(x_{1+n-h} x_1 + x_{2+n-h} x_2 + \ldots + x_n x_h).$$

It is clear by the first summation term that $n-h \geq 1 \Rightarrow h \leq n-1$ and, by definition, $h \geq 0$. Thus, $0 \leq h \leq n-1$. The 0-lag correlation is always +1; by above relation, $$R_0 = \sum_{i=1}^{n-0} x_i x_{i+0} + \sum_{i=1}^{0} x_{1+n-0} x_i = \sum_{i=1}^{n} x_i^2 = S_2, \text{ where}$$

$$\sum_{i=1}^{0} (\bullet) = 0,$$

by definition. Substitution of the term $S_2$ into equation (5) shows R=+1. Note though that, as pointed out by Wald and Wolfowitz, p. 378, the noncircular form of the autocorrelation test of randomness omits the second term of Eq. (11), $$\sum_{i=1}^{h} x_{i+n-h} x_i.$$

The wrap-around circular pattern of the cross-product term, $$R_h = \sum_{i=1}^{n-h} x_i x_{i+h} + \sum_{i=1}^{h} x_{i+n-h} x_i$$

for the first four lags, h=0,1,2,3 can be shown as:

$$\text{Lag-0: } R_0 = \sum_{i=1}^{n} x_i^2 \quad (12a)$$

$$\text{Lag-1: } R_1 = \sum_{i=1}^{n-1} x_i x_{i+1} + x_n x_1 \quad (12b)$$

$$\text{Lag-2: } R_2 = \sum_{i=1}^{n-2} x_i x_{i+2} + x_{n-1} x_1 + x_n x_2 \quad (12c)$$

$$\text{Lag-3: } R_3 = \sum_{i=1}^{n-3} x_i x_{i+3} + x_{n-2} x_1 + x_{n-1} x_2 + x_n x_3 \quad (12d)$$

Figure 4:
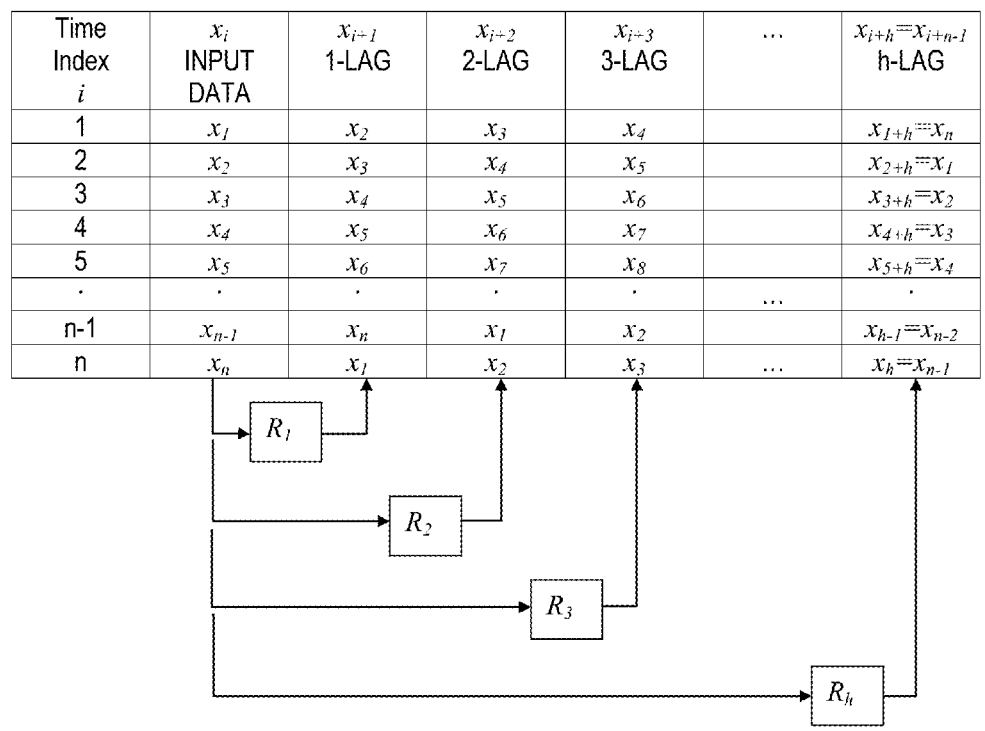
FIG. 4 is a graph showing the pattern for an arbitrary lag or a max lag, in accordance with the present disclosure.

Or more particularly, and referring now to FIG. 4, shown therein is the circular structure discussed above in tabular format, wherein the circular structure is more particularly identified by the corresponding cross-hatchings. The "circular" pattern of last values for a lag h, corresponding to the second summation term of equation (11). Note that the h-lag of the last column shown in FIG. 4 shows the pattern for an arbitrary lag or a max lag.

In accordance with certain aspects, to test an overall hypothesis of "noise" for all h-lags in small samples the present disclosure determines the critical values for $R_h$ & $R_{x,x+h}$ at the $\alpha=5\%$ false alarm rate level. Set the critical detection statistic to $$\left| \frac{R_h - E(R)}{\sqrt{\text{var}(R)}} \right| \overset{>}{\underset{<}{}} 1.96 \quad \begin{matrix} \text{reject } H_0 \text{ (signal)} \\ \text{accept } H_0 \text{ (noise)} \end{matrix} \quad (13)$$

and (a) first solve for $R_h$ as a lower bound ($R_{h_L}$) and an upper bound ($R_{h_U}$), and (b) plug those values into the circular correlation index, $R_{x,x+h}$ of Eq. (5), to determine the lower/upper noise bounds. Calculations will show for the exemplary data set shown in table 100 of FIG. 1, $$R_{h_L} < E(R) - 1.96\sqrt{\text{var}(R)} \Rightarrow R_{h_L} = 35486.29 - 1.96\sqrt{20020.51} = 35209$$

$$R_{h_U} > E(R) + 1.96\sqrt{\text{var}(R)} \Rightarrow R_{h_U} = 35486.29 + 1.96\sqrt{20020.51} = 35764 \quad (14)$$

Once $R_{h_L}$ and $R_{h_U}$ are determined, use them to find the lower/upper critical bounds on the circular correlation, $R_{x,x+h_L}$ and $R_{x,x+h_U}$. The critical lower bound on the circular serial correlation, $R_{x,x+h}$, will be by equation (5):

$$R_{x,x+h_L} = \frac{R_{h_L} - \frac{S_1^2}{n}}{S_2 - \frac{S_1^2}{n}} = \frac{35209 - \frac{(730)^2}{15}}{36092 - \frac{(730)^2}{15}} = -.56. \quad (15)$$

The critical upper bound on $R_{x,x+h}$ will be:

$$R_{x,x+h_U} = \frac{R_{h_U} - \frac{S_1^2}{n}}{S_2 - \frac{S_1^2}{n}} = \frac{35764 - \frac{(730)^2}{15}}{36092 - \frac{(730)^2}{15}} = +.42. \quad (16)$$

Note that the critical noise bounds (−0.56,+0.42) are not symmetrical about 0. However, if we use the average of $R_{h_L}$ & $R_{h_U}$ which equals E(R) we obtain $R_{x,x+h}=-0.07$ which is the average of the lower/upper bounds on $R_{x,x+h}$, suggesting that as n grows the correlation bounds will center around 0 (which is the WGN bounds of $\pm 1.96/\sqrt{15}=\pm 0.51$). Note that, in a similar fashion, the 1% lower/upper bounds on $R_{x,x+h}$ are computed to be (−0.72,+0.57). For this calculation use ±2.576 vice ±1.96 in obtaining the bounds.

Figure 5:
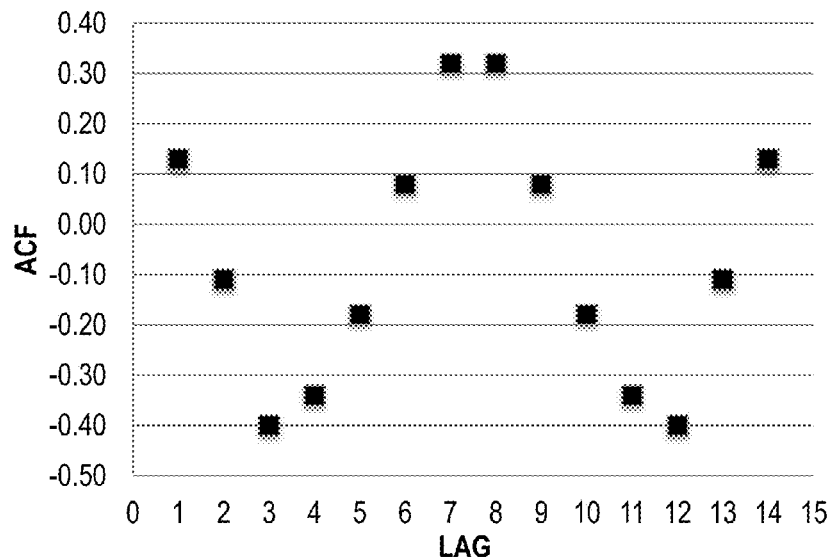
FIG. 5 is an exemplary correlogram illustrating the ACF for the data set of FIG. 1 computed for all lags.

The lower and upper bounds on the correlations can be plotted on a correlogram to show the results. For example, and referring now to FIG. 5, shown therein is a correlogram 500 illustrating the ACF for the Hoel et al. data set of FIG. 1 computed for all lags. The noise bounds of (−0.56,+0.42) are indicated by the lines 505 and 510, respectively. As seen, every correlation value is contained within the critical boundary, indicating a noise distribution. Note the "W" shaped symmetric structure for lags 1 to 14 of the correlogram 500 indicates that the correlation of the first and last lags are identical, the second is identical to the next-to-last, etc. The reason for this is seen by the symmetry of the matrix of $R_h$ product values for corresponding lags created by the recycling process of the method for discrete time/lags, unique to the Wald-Wolfowitz circular correlation; continuous time measurements would not show the symmetry for the first quadrant of ACFs (p. 380, Wald and Wolfowitz); i.e., lag(k) =lag(n−k), k=1, 2, . . . , h/2, which means in general, for even or odd sample size n, $$R_h = \begin{cases} R_{n-h} & \left[h = 1, 2, ..., \frac{n}{2}(n \text{ even})\right] \\ R_{n-h} & \left[h = 1, 2, ..., \frac{n-1}{2}(n \text{ odd})\right] \end{cases} \quad (17)$$

Figure 6:
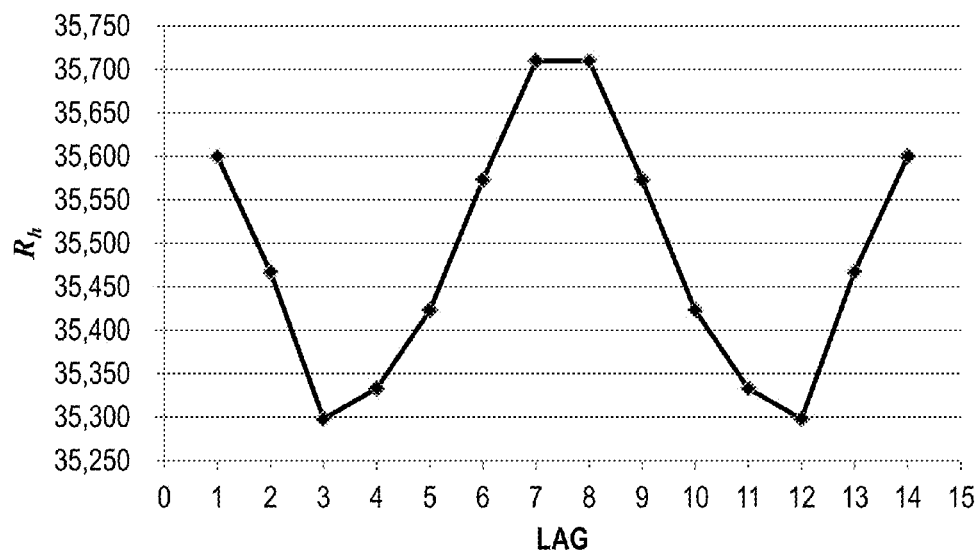
FIG. 6 is a chart illustrating the distribution of the cross product term $R_h$ by lag, $h \geq 1$, in accordance with the present disclosure.

The values $$\frac{n}{2} \text{ and } \frac{n-1}{2}$$

represent the "median" values of the ACF—the point beyond which symmetry is reflected with lags up to those points on the ACF. Turning now to FIG. 6, shown therein is a chart illustrating the distribution of the cross product term $R_h$ by lag, h≥1. The $R_h=R_{n-h}$ symmetry structure is identical to the pattern of correlation shown in FIG. 5. FIG. 6 shows the distribution of $R_h$ values across all lags which bears out the hypothesis of Eq. (17). The reason for the symmetry is easy to show. If n−h is substituted for h in equation (11), it follows that, $$R_{n-h} = \sum_{i=1}^{h} x_{i+n-h} x_i + \sum_{i=1}^{n-h} x_i x_{i+h}$$

which is identical to equation (11) since the summation terms are commutative. Thus $R_h=R_{n-h}$ for 1≤h≤n−1. These relationships determine the symmetry of the correlations separated by a predictable lag length that are shown in FIG. 6. The lag-symmetry of the correlations is given by the expression, $$R_{x,x+h} = R_{x,x+n-h}, h \geq 1 \quad (18)$$

where $R_{x,x}=+1$ by definition. This relation follows since only $R_h$ is variable in equation (5) and there is linear relationship between $R_h$ & $R_{x,x+h}$. For example, lag 5 $R_h$ for n=15 is:

$$R_5 = \sum_{i=1}^{10} x_i x_{i+5} + \sum_{i=1}^{5} x_{i+10} x_i. \quad (19)$$

For lag 10 $R_h$ is $$R_{10} = \sum_{i=1}^{5} x_i x_{i+10} + \sum_{i=1}^{10} x_{i+5} x_i.$$

Clearly the terms of the summations for each lag are equal as shown earlier. Hence $R_5 = R_{10}$ and the correlations will be equal, $R_{x,x+5} = R_{x,x+10}$. The symmetry is evident for all lags $h \geq 1$ which satisfies the relation $\text{lag}(k) = \text{lag}(n-k=1, 2, \ldots, h/2$ of equation (17).

To further exemplify these relationships for various sample sizes, $$\text{if } n = 25, \quad R_h = R_{25-h}, h = 1, 2, \ldots, 12$$
$$\text{if } n = 30, \quad R_h = R_{30-h}, h = 1, 2, \ldots, 15$$
$$\text{if } n = 49, \quad R_h = R_{49-h}, h = 1, 2, \ldots, 24$$
$$\text{if } n = 50, \quad R_h = R_{50-h}, h = 1, 2, \ldots, 25$$
$$\vdots$$

If sample size n is an odd number, symmetry occurs after the $$\frac{n-1}{2} th$$

lag and $$\frac{n}{2} th \text{ (even } n\text{)}.$$

This suggests that when the ACF is computed on samples for $h=n-1$ lags, symmetrical or redundant information is plotted on the correlogram on either side of the median value of the max. lag; i.e., $$\frac{n-1}{2}(\text{odd } n), \frac{n}{2}(\text{even } n).$$

For larger samples (n>22) the complete symmetry will be less evident when the MATLAB default criterion determining the maximum number of lags to process in an ACF analysis is used; i.e., $\max_h = \min(20, n-1)$.

In accordance with certain aspects of the present disclosure, the fundamental theoretical and programming implication of the foregoing is that only 1/2 the correlations are needed to completely characterize the ACF for n=15. Such an implication applies to studies with larger sample sizes. FIG. 7 is a table 700 that shows exemplary minimum number of lags for varying sample sizes. As shown in table 700, for small samples (n≤39), fewer computations are needed and the same amount of information is extracted compared to the default MATLAB™ criterion, $\max_h$, using the function, autocorr (Series,nLags,M, nSTDs). These sample sizes coincide with typical naval signal processing algorithms that process Filtered Integrated Data Units (FIDUs) in batch mode.

Note, the choice of $\min_h$, as opposed to $\max_h$, in deciding how many lags to process is practical for non-large samples. It is impractical to plot 500 ACF values for n=1000; however, a large data set can be randomly sampled once or resampled multiple times to obtain an estimate of the exact ACF of the entire sample by use of the $\min_k$ criterion of the presently disclosed inventive method.

In accordance with certain aspects of the present disclosure, the complete ACF for noise-signal at the 5% level may be assessed by counting the integer number of times c the correlation values exceed the noise bounds for h≥1. Then, $$c > \frac{lags}{20} \rightarrow \text{"signal"} \quad (20)$$

$$c \leq \frac{lags}{20} \rightarrow \text{"noise"}.$$

Fractional values of c may be rounded to the next higher integer. For the present data, c=0, and $$c \leq \frac{lags}{20} \rightarrow \text{"noise"}.$$

Note that h=0 can be excluded since the circular correlation for the 0-lag is always +1 regardless of sample size and is therefore not a value reflective of the strength of the relationships among the data.

In the alternative, a user may assess the hypothesis by equation (20) based only on the number of non-redundant lower (or upper) lags of the ACF; in the case of n=15, the "lags" of equation (20) would be 7 in which case since c was observed to be 0, the null hypothesis of noise only would be accepted. Note, to assess the complete ACF for noise-signal at the 1% level, the criterion for h≤1 is:

$$c > \frac{lags}{100} \rightarrow \text{"signal"} \quad (21)$$

$$c \leq \frac{lags}{100} \rightarrow \text{"noise"}$$

Now, we compare the data analysis results of the exact circular correlation procedure for the 15 sample data set shown in table 100 of FIG. 1 with the standard normalized non-circular autocorrelation function. Autocorrelations were computed for the maximum number of lags. The α=5% WGN error band is constant for all lags at $$\pm \frac{1.96}{\sqrt{n}} = \pm \frac{1.96}{\sqrt{15}} = \pm.51$$

and is symmetric around the ACF value of 0. While differences exist in individual values, all correlations show a "noise" distribution (i.e., p≥α), consistent with the data results for circular correlation, as described herein.

The most significant difference is the lack of symmetry of the correlation values. By comparison, the circular ACF of FIG. 5 requires only 7 values to render the decision "noise" because of the median-symmetry property. It can also be reiterated that the drawback of losing one observation per lag with the non-circular autocorrelation method.

The process and computer-implemented method steps described herein comprise the essential steps needed to arrive at a decision of signal-noise for the entire discrete ACF, in accordance with the present disclosure. Exemplary and/or alternative measures are generally (a) the $R_h$ of equation (11), (b) the $\tau_h$ and the rejection criterion of equation (13), and (c) probability p, equation (10). These statistics provide alternative means or variations, alone or in combination, to practice certain aspects of the present disclosure. For example, the 1-lag test of randomness requires (a), (b) and (c) to evaluate the hypothesis of noise only with the non-parametric circular correlation index provided n is sufficiently large. As a second example, users who desire to use the noncircular form of the non-parametric test procedure of Wald and Wolfowitz for randomness assessment with lag 1 need to adjust the statistic $R_h$ by omitting the second term of equation (11), $$\sum_{i=1}^{h} x_{i+n-h} x_i.$$

Users may desire that those statistics be made available with other aims in mind. Moreover, to reduce computational memory load for large numbers, Wald and Wolfowitz (p. 383) suggest to transform the input data $x_i$ by subtracting the mean, $$\bar{x} = \frac{1}{n}\sum_{i=1}^{n} x_i,$$

from each value of $x_i$; i.e., redefine $$x_i \rightarrow x_i - \frac{1}{n}\sum_{i=1}^{n} x_i.$$

This makes $S_1=0$ since $$\sum_{i=1}^{n}(x_i - \bar{x}) = 0.$$

Calculations for the mean and variance and other statistics are conducted on the transformed variate, $x_i - \bar{x}$. If $S_1 = 0$, calculations of E(R) and var(R) are simplified in equations (7) and (8). The linear transformation changes the value of the cross-product term, $R_h$, but the correlation indices, and values comprising the hypothesis testing certain steps of the disclosed procedure are unaffected by subtracting a constant; this follows by the rules for moments of linear combinations of random variables.

As another alternative or variation, the present inventive method can be used to assist in randomness determination in patents to F. J. O'Brien, Jr. which are designed for two-dimensional Cartesian space. These patents include: U.S. Pat. No. 6,983,222; U.S. Pat. No. 6,397,234; and U.S. Pat. No. 5,966,414, the contents of which are incorporated herein by reference in their entirety.

As a final alternative or variation, users may wish to run additional tests of randomness as confirmatory evidence of randomness in the case of fairly small samples (n<25). One procedure that has been tested and found to particularly useful for small samples is the Wald-Wolfowitz Runs Test (pages 378-388). The above listed patents demonstrate this multi-stage noise discrimination procedure for small and large samples.

From the above, it is clear that the herein described inventive concepts provide an improved system on non-parametric circular autocorrelation for signal processing and method of use. As discussed above, prior methods utilizing the Wald-Wolfowitz one-lag ACF test, in certain instances, fail to make the correct signal/noise determination. A clear discussion of this, as well as the application of the present disclosure to overcome said failings is discussed below with respect to FIG. 8.

Figure 8:
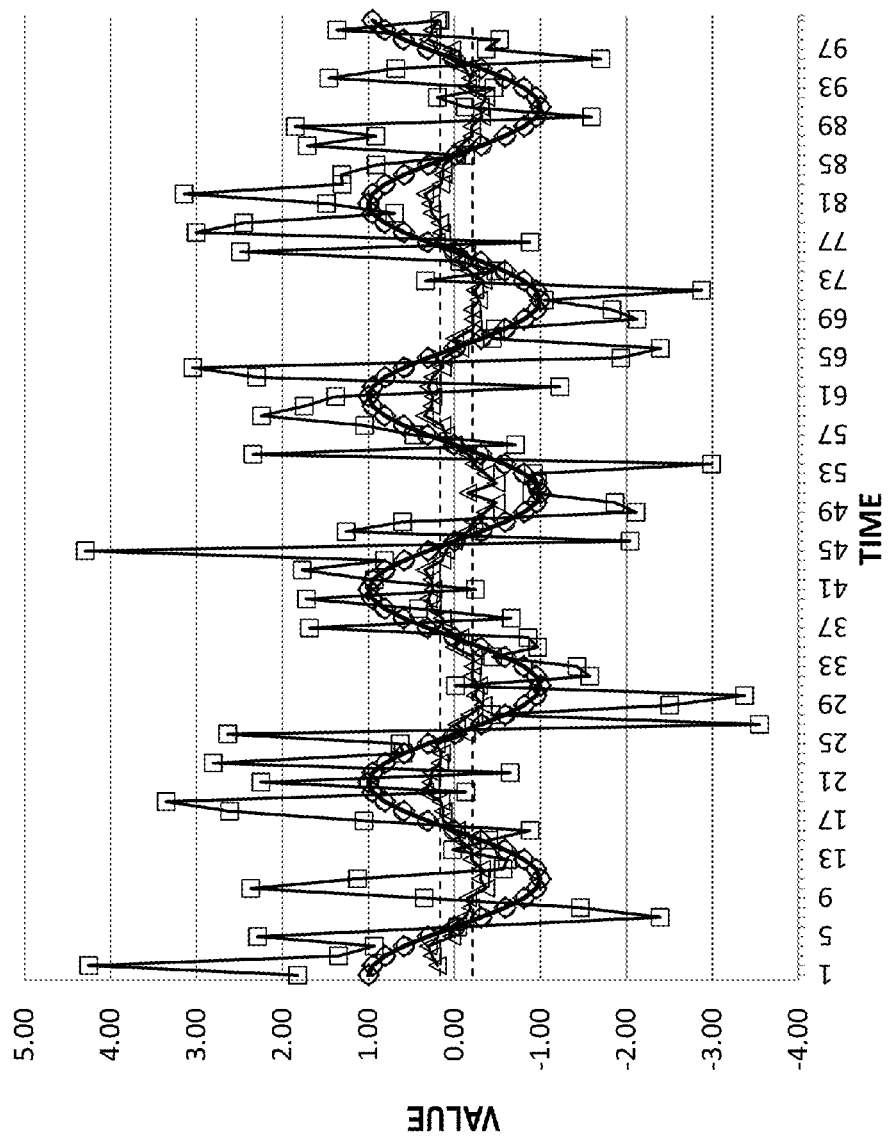
FIG. 8 is a graph illustrating an example of a noise-corrupted sinusoid and ACF evaluated as "signal" utilizing aspects of the present disclosure.

FIG. 8 is a graph illustrating an example of a noise-corrupted sinusoid and ACF evaluated as "signal" utilizing aspects of the present disclosure. For the graph, the number of discrete data points or vectors is n=100. The false alarm rate was 0.001, or a confidence level of 0.999. The ACF in accordance with the present disclosure is identified with triangular data markers. The input data, a sinusoid with noise is identified with square data markers. The sinusoid is indicated with circular markers, and the time average limiting form of the ACF, $R_{xx}$, is indicated with diamond data markers. The upper and lower correlation bounds, as determined by the present disclosure, are identified by dashed lines above and below "0".

In the illustration shown in FIG. 8, a 160% noise signal was added to a sinusoidal signal, resulting in a signal-to-noise that averaged nearly −12.6 dB over four simulation runs. It will be noticed that the early 3 lags are "noise". This means that the standard circular non-parametric Wald-Wolfowitz ACF procedure discussed above evaluates this distribution as "noise" based on lag-1. But, in fact, it is a signal distribution in accordance with the currently described inventive method based on standard false alarm rate analysis. FIG. 8 is but one example demonstrating the inadequacy of a one-lag only Wald-Wolfowitz signal test method in signal processing. In summary, the presently disclosed inventive methods illustrate that the Wald-Wolfowitz ACF test tends to fail to detect signal structure as the noise level increases for a fixed sample size and false alarm rate.

Therefore, it is believed that engineers use the valuable Wald-Wolfowitz circular ACF test incorrectly when they analyze only the first lag (the standard approach as recommended in the original article by Wald and Wolfowitz) in order to determine whether the time series data is a signal or noise. Analyzing the first-lag can provide very misleading diagnostics. The commonly used procedure is not always correct in trapping a signal. The real signal in the time domain can go undetected when operating in a noisy signal processing environment. This is considered to be a serious error.

These and other function and implementation details regarding the systems and methods of the presently described and claimed inventive concepts will be described in greater detail below with reference to the FIGS. 9-10.

It is to be understood that the presently disclosed inventive steps may be implemented using a wide variety of computerized devices(s), processing system(s), software application modules, and the like. Such systems may include hardware, software, or combinations thereof that, when executed, are configured to perform the herein disclosed inventive steps and methods.

Figure 9:
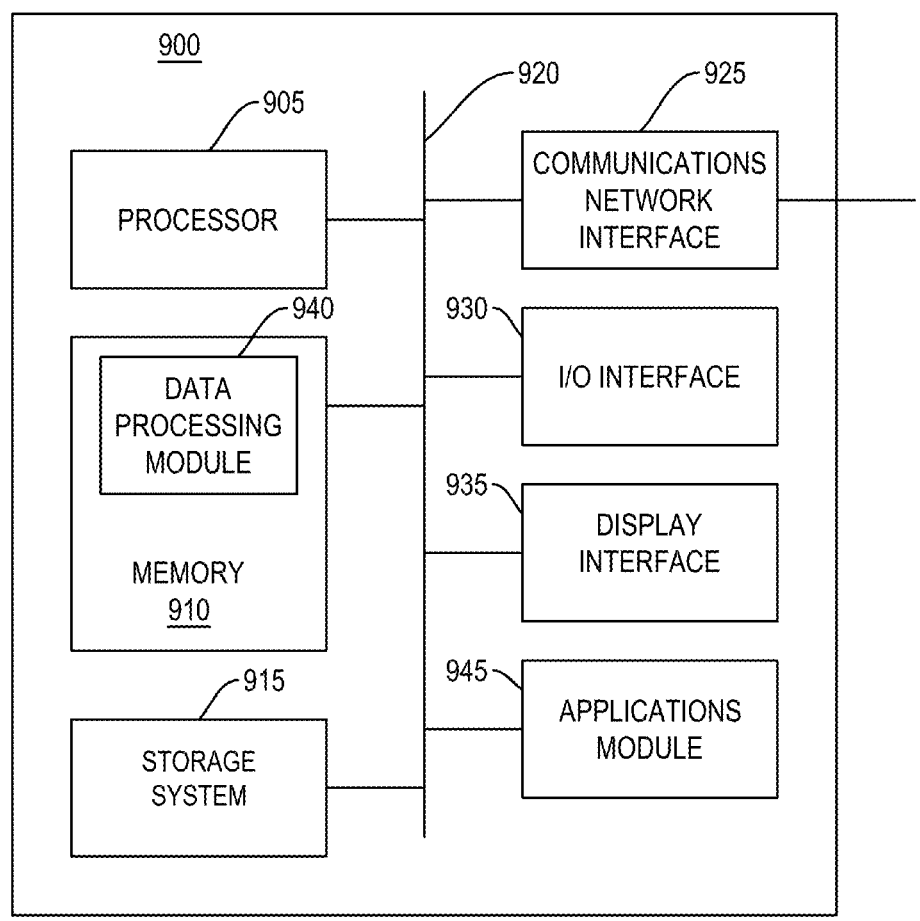
FIG. 9 is a block diagram of an exemplary architecture of a system which may be adapted to practice aspects of the present disclosure.

Referring now to FIG. 9, shown therein is an exemplary architecture of a system 900 which may be adapted to practice aspects of the present disclosure. That is, the exemplary architecture illustrated in FIG. 9 includes hardware, software, and/or combinations thereof, adapted to implement certain aspects of the presently disclosed and claimed inventive concept(s). The exemplary architecture is provided by way of example only and is not intended to be limiting. Changes and variations to the exemplary architecture illustrated in FIG. 9 are considered within the scope of the present disclosure.

A module (or application), as referenced in the present invention, should be generally understood as a collection of routines that perform various system-level functions and may be dynamically loaded and unloaded by hardware and device drivers as required. The modular software components described herein may also be incorporated as part of a larger software platform or integrated as part of an application specific component. Changes and variations to the exemplary architecture illustrated in FIG. 9 are considered within the scope of the present disclosure.

The system 900 may include one or more processors 905 and memory 910. The memory 910 may store, in part, instructions and data for execution by the processor 905. The memory 910 may store executable code when in operation. The memory 910 may include a data processing module 940 for processing data. The system 900 may further include a storage system 915, communication network interface 925, input and output (I/O) interface(s) 930, and display interface 935. Data vectors can be received from sensors at communication network interface 925. Signal characterization data can be provided as output through at least one of communication network interface 925, I/O interface 930 and display interface 935. The components shown in FIG. 9 are depicted as being communicatively coupled via a bus 920. The components may be communicatively coupled via one or more data transport means. The processor 905 and memory 910 may be communicatively coupled via a local microprocessor bus, and the storage system 915 and display interface 935 may be communicatively coupled via one or more input/output (I/O) buses. The communications network interface 925 may communicate with other digital devices (not shown) via a communications medium.

The storage system 915 may include a mass storage device and portable storage medium drive(s). The mass storage device may be implemented with a magnetic disk drive or an optical disk drive, which may be a non-volatile storage device for storing data and instructions for use by the processor 905. The mass storage device can store system software for implementing embodiments according to the present technology for purposes of loading that software into the memory 910. Some examples of the memory 910 may include RAM and ROM. A portable storage device, as part of the storage system 915, may operate in conjunction with a portable non-volatile storage medium, such as a floppy disk, compact disk or digital video disc (DVD), to input and output data and code to and from the system 900 of FIG. 9. System software for implementing various embodiments may be stored on such a portable medium and input to the system 900 via the portable storage device. The memory and storage system of the system 900 may include a non-transitory computer-readable storage medium having stored thereon instructions executable by a processor to perform, at least partially, a computer-implemented method for to characterize a signal structure, in accordance with the present disclosure. The instructions may include software used to implement modules discussed herein, and other modules.

I/O interfaces 930 may provide a portion of a user interface, receive audio input, and provide audio output. The I/O interface 930 may include component(s), logic instructions, and/or combinations thereof, adapted to permit the user to interface with the system 900. The I/O interfaces 930 may include an alpha-numeric keypad, such as a keyboard, for inputting alpha-numeric and other information, or a pointing device, such as a mouse, trackball, stylus, or cursor direction keys. The display interface 935 may include a liquid crystal display (LCD) or other suitable display device. The display interface 935 may receive textual and graphical information, and process the information for output to the display interface 935.

The system 900 may include any computerized system that can implement a web browser application or other suitable applications adapted to request and provide information to and from the system 900 via a network. Exemplary systems adapted to implement the system 900 include, but are not limited to, a general purpose computing system, a personal computer, a laptop computer, a netbook, a personal digital assistant (PDA), a smart phone, an e-reader, and/or equivalents thereof. Exemplary software applications included on the system 900 include a web browser application, a word processor application, a time keeping/tracking application, a communication application, as well as a wide variety of applications understood by one having ordinary skill in the art.

Broadly, the network discussed above may be adapted to provide a communications medium to permit one or more systems 900 to communicate with other systems 900, or a remote processing system (not shown), and vice versa. The network can be implemented via the World Wide Web (WWW), a wide area network (WAN), a local area network (LAN), the Internet, an intranet, a wireless network, a cellular telephone network, and/or equivalents or combinations thereof.

The system 900 may include component(s), logic instructions, and/or combinations thereof, adapted to implement at least a portion of the currently described and claimed inventive concept(s). The system 900 may include instructions stored on non-transitory computer readable medium that when executed causes the processing system to implement the present technology.

The system 900 may further include an applications module 945, which may include one or more of programs, applications, logic instructions, and computer executable code adapted to operate the system 900 as well as to carry out at least a portion of the currently described and claimed inventive concept(s).

It is to be understood that the description provided above regarding the particularities of the exemplary architecture implementing the system 900 is provided by way of example and is not to be considered limiting. The system 900 may be implemented as described above or with a variety of modifications and/or changes to the architecture without departing from the particular functions described herein. For example, the system 900 may be implemented as a stand-alone server, as a web server, as a distributed server system, as an application server, in combination with a database server, etc. When the system 900 is implemented as a webserver, the system 900 may communicate with other systems 900, via the network, through a series of web pages. The system 900 may be implemented as a single web server or as a distributed processing system including a plurality of server(s) coupled to one or more databases, either locally or remotely.

Figure 10:
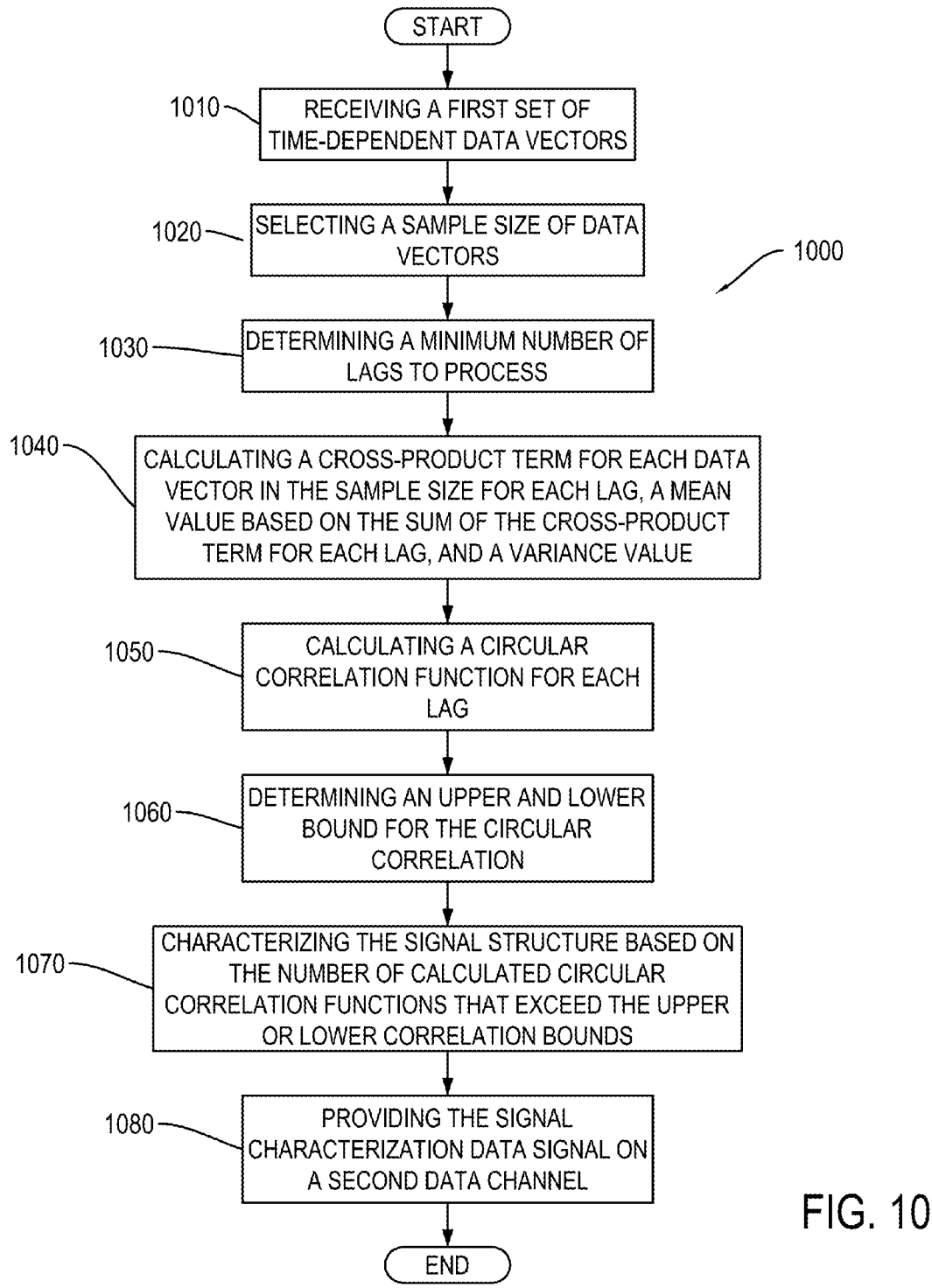
FIG. 10 is a flowchart of an exemplary method to characterize a signal structure, in accordance with the present disclosure.

Turning now to FIG. 10, shown therein is a flowchart of an exemplary method 1000 to characterize a signal structure, in accordance with the present disclosure. The method 1000 may be computer-implemented using, for example, the system 900, combinations, or equivalents thereof. The method 1000 may include a step 1010 of receiving a first set of time-dependent data vectors. The data vectors may be received via a first data channel. The first data channel may be a wired or a wireless channel, an optical channel, a radio-frequency channel, and the like, e.g., the bus 920, communications network interface 925. Generally, the input data vectors or time-dependent data vectors {t,x} where t is clock time t≥0 and x(t) is the amplitude measure in the time domain, i.e., each of the data vectors may have an associated amplitude. The step 1010 may further include performing preprocessing conditioning, filtering, formatting, etc., as necessary. The method 1000 may also include a step 1020 of selecting a discrete sample size n. That is, the step 1020 may include selecting a sample size of the input data vectors n from the first set of data vectors. The step 1020 may be performed via a signal characterization module that executes instructions that, when executed, cause the signal characterization module to carry out at least a portion of the herein described steps. The signal characterization module may be implemented via, for example, the system 900 and/or the one or more application modules thereon. If required, the step 1020 may further include time domain sampling, such as described herein. The inventive concepts recited in the present disclosure can easily handle sample sizes which coincide with typical naval signal processing algorithms that process Filtered Integrated Data Units (FIDUs) in batch mode. A large data set can be randomly sampled to obtain an estimate of the ACF of the entire sample by use of the $\min_k$ criterion of the inventive method. Small sample sizes of about 100 or less may not need to be sampled in order to analyze the entire ACF.

Once any required sampling is accomplished, the method 1000 may further include a step 1030 of determining a minimum number of lags to process to characterize the first set of data vectors. The minimum number of lags to process may be based on the sample size n from the first set of data vectors. The minimum number of lags to process may be determined with the criterion $$\min_h = \left[\frac{n-1}{2}(n \text{ odd}); \frac{n}{2}(n \text{ even})\right]. \tag{22}$$

The method 1000 may further include a step 1040 of calculating a cross-product term for each data vector in the sample size for each lag, a mean value based on the sum of the cross-product term for each lag, and a variance value. The cross product term may be calculated using equation (11) above. The mean value may be calculated using equation (7), above. The variance value may be calculated using equation (8), above. The method 1000 may further include a step 1050 of calculating a circular correlation function for each lag. The cross correlation function may be calculated using equation (5) above. The values $R_{x,x+h}$ may optionally be plotted on a correlogram.

The method 1000 may further include a step 1060 of determining an upper and a lower correlation bound for the circular correlation. The upper and lower correlation bounds may be based on the mean value, the variance value, and a desired false alarm rate. Generally, critical upper and lower noise bounds on the correlations, $R_{x,x+h_L}$, $R_{x,x+h_U}$, are calculated first using equation (13) discussed above, wherein the constant 1.96 represents a desired false alarm rate of five percent (5%), i.e., using the equations $$\left.\begin{array}{l}R_{h_L} = E(R) - 1.96\sqrt{\text{Var}(R)} \\ R_{h_U} = E(R) + 1.96\sqrt{\text{Var}(R)}\end{array}\right\} 5\% \text{ false alarm rate} \tag{23A}$$

and $$\left.\begin{array}{l}R_{h_L} = E(R) - 2.576\sqrt{\text{Var}(R)} \\ R_{h_U} = E(R) + 2.576\sqrt{\text{Var}(R)}\end{array}\right\} 1\% \text{ false alarm rate} \tag{23B}$$

Once the critical upper and lower noise bounds are determined, those values are inserted into equation (5) above in which $R_{h_L}$ replaces $R_h$ for the lower correlation bound $R_{x,x+h_L}$ and $R_{h_U}$ replaces $R_h$ for the upper correlation bound $R_{x,x+h_U}$.

The method 1000 may further include a step 1070 of characterizing the signal structure based on the number of calculated circular correlation functions that exceed the upper or lower correlation bounds. In certain aspects, a parameter c may be counted to ascertain the number of computed autocorrelation values which exceed the noise bounds. Fractional values of c may be rounded up to the next higher integer. The decision module (e.g., the signal characterization module) determines whether the ACF is signal or noise. Eq. (20) makes this determination at the 5% false alarm level and Eq. (21) at the 1% false alarm level. Other conclusions and decisions about the vector data set may be made about the structure of the time waveform such as periodicity or other trends to inform further analysis of the data set. A signal characterization data signal may be generated which is indicative of whether the first set of data vectors include a signal component, a noise component, combinations thereof, and the like.

The method 1000 may further include a step 1080 of outputting the signal characterization data signal on a second data channel. The second data channel may utilize the same or similar data channel as the first data channel or may be an independent data channel. The output signal characterization data signal may be output as an electronic or hard copy computer analysis (graphic or text). The output signal characterization data signal may be provided to additional processing modules for further analysis. Additional exemplary analysis may include a power spectral density (PSD) analysis of the ACF to further characterize the signal information of non-random data, or noise reduction algorithms used to remove the identified noise, or Fishers' classical test for periodicities, among other procedures, well known to those skilled in the art of this field.

From the description discussed above, it is clear that the currently disclosed inventive method possesses several key advantages and new features over the standard autocorrelation method currently available to scientists and engineers for testing a signal-noise binary hypothesis—for example the popular MATLAB™ procedure with syntax, autocorr (Series,nLags,M,nSTDs). An important advantage of the current disclosure is that it makes no assumptions about the underlying distribution; that is, it is non-parametric. This means the method can be used for Gaussian or non-Gaussian models and call "signal" or "noise" with high certainty. Second, the method can perform a complete analysis for the maximum number of lags in one-half the time the same data set is processed by the standard non-circular correlation method. This is due to the symmetry of the correlations for h lags, as explained herein. Third, the method does not lose "one observation per lag" as the standard non circular parametric method does. This is especially important for small samples in which the $h^{th}$ lag may contain only a handful of observations which results in lower confidence in the estimates.

It will be understood that many additional changes in the details, materials, steps and arrangement of parts, which have been herein described and illustrated in order to explain the nature of the invention, may be made by those skilled in the art within the principle and scope of the invention as expressed in the appended claims. The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A computer-implemented method to characterize a signal structure of an environmental signal received at a receiver comprising:
   receiving a first set of data vectors of the environmental signal from the receiver on a first data channel, each data vector, $x_1, x_2, \ldots x_n$, having a length n and an associated amplitude, and said first set of data vectors being time-dependent;
   selecting a sample size of data vectors from the first set of data vectors utilizing a data processor;
   determining a minimum number of lags to process to characterize the first set of data vectors based on the selected sample size utilizing a data processor;
   calculating a cross-product term for each data vector in the selected sample size for each determined lag utilizing a data processor;
   summing each data vector used in the cross-product term for each determined lag by a data processor to give sums, $S_1$, $S_2$, $S_3$ and $S_4$ of the calculated cross-product term wherein:

$$S_j = \sum_{i=1}^{n} x_i^j;$$

calculating a mean value $\mu = E(R)$ utilizing a data processor based on the data vector length n and sums, $S_1$ and $S_2$, of the calculated cross-product term for each determined lag in accordance with:

$$E(R) = \frac{S_1^2 - S_2}{n-1};$$

calculating a variance value $\sigma^2 = \text{var}(R)$ utilizing a data processor based on the sums of the calculated cross-product term for each determined lag in accordance with:

$$\text{var}(R) = \frac{S_2^2 - S_4}{n-1} + \frac{S_1^4 - 4S_1^2 S_2 + 4S_1 S_3 + S_2^2 - 2S_4}{(n-1)(n-2)} - \frac{(S_1^2 - S_2)^2}{(n-1)^2};$$

calculating a circular correlation function for each determined lag utilizing a data processor;
   determining an upper and a lower correlation bound for the calculated circular correlation function utilizing a data processor based on the calculated mean value, the calculated variance value, and a predetermined, desired false alarm rate;
   characterizing the signal structure utilizing a data processor based on the number of calculated circular correlation functions that exceed one of the determined upper and lower correlation bounds to generate a signal characterization data signal characterizing the environmental signal as one of "signal" or "noise"; and
   providing the generated signal characterization data signal on a second data channel.

2. The method of claim 1, wherein the step of determining a minimum number of lags to process utilizes the function $$\min = \left[\frac{n-1}{2}(n \text{ odd}); \frac{n}{2}(n \text{ even})\right],$$

where n is the sample size.

3. The method of claim 1, wherein the step of calculating a cross-product term for each data vector in the selected sample size for each determined lag utilizes the function $$R_h = \sum_{i=1}^{n-h} x_i x_{i+h} + \sum_{i=1}^{h} x_{i+n-h} x_i =$$
$$(x_1 x_{1+h} + x_2 x_{2+h} + \ldots + x_{n-h} x_n) + (x_{1+n-h} x_1 + x_{2+n-h} x_2 + \ldots + x_n x_h),$$
$$0 \leq h \leq n-1$$

where $R_h$ is the cross-product term, x is the amplitude of the data vector, n is the sample size, and h is the lag number.

4. The method of claim 1, wherein the step of calculating the a circular correlation function for each determined lag utilizes the function $$R_{x,x+h} = \frac{\sum_{i=1}^{n-h} x_i x_{i+h} + \sum_{i=1}^{h} x_{i+n-h} x_i - \frac{\left(\sum_{i=1}^{n} x_i\right)^2}{n}}{\sum_{i=1}^{n} x_i^2 - \frac{\left(\sum_{i=1}^{n} x_i\right)^2}{n}},$$

$$-1 \leq R_{x,x+h} \leq +1; 0 \leq h \leq n-1$$

where n is the sample size, h is the lag number, and x is the amplitude of the data vector.

5. The method of claim 4, further comprising the step of plotting the circular correlation for each determined lag onto a correlogram.

6. The method of claim 1, wherein the step of determining an upper and a lower correlation bound utilizes the functions $$R_{h_L} < E(R) - \text{FAR}\sqrt{\text{var}(R)} \Rightarrow R_{h_L}$$

$$R_{h_U} > E(R) + \text{FAR}\sqrt{\text{var}(R)} \Rightarrow R_{h_U}$$

where $R_{h_L}$ is a lower bound cross-product term, $R_{h_U}$ is an upper bound cross-product term, E(R) is the mean value, var(R) is the variance value, and FAR is a constant indicative of the desired false alarm rate.

7. The method of claim 6, further comprising selecting the FAR constant from the group of 1.96 for a desired false alarm rate of 5 percent, and 2.576 for a desired false alarm rate of 1 percent.

8. The method of claim 6, wherein the step of determining the upper and lower correlation bound utilizes the function $$R_{x,x+h_L} = \frac{R_{h_L} - \frac{S_1^2}{n}}{S_2 - \frac{S_1^2}{n}}$$

to determine the lower correlation bound, and the function $$R_{x,x+h_U} = \frac{R_{h_U} - \frac{S_1^2}{n}}{S_2 - \frac{S_1^2}{n}}$$

to determine the upper correlation bound, where $S_1$ is the sum of the amplitudes of the data vectors within a lag, $S_2$ is a product of the sum of the amplitudes of the data vectors within the lag, and n is the sample size.

9. The method of claim 1, wherein the step of characterizing the signal structure utilizes the function $$c > \alpha lags \rightarrow \text{"signal"}$$

$$c \leq \alpha lags \rightarrow \text{"noise"}$$

where c is the integer number of times the circular correlation functions for each lag exceeds the upper or lower critical bounds, and $\alpha$ is a constant indicative of the desired false alarm rate.

10. The method of claim 9, wherein the $\alpha$ constant is selected from the group consisting of 20 for a desired false alarm rate of 5 percent, and 100 for a desired false alarm rate of 1 percent.

11. The method of claim 1, further comprising the step of performing a power spectral density analysis of the circular correlation functions in the step of characterizing the signal structure in order to generate a signal characterization data signal.

12. The method of claim 1, wherein the signal characterization data signal is output to a graphic display.

13. The system of claim 1 wherein the environmental signal is a sonar signal and the receiver is an acoustic receiver.

14. The system of claim 1 wherein the environmental signal is an electromagnetic signal and the receiver is a radio receiver.

15. A signal structure characterization system for an environmental signal received by a receiver comprising:
  a first data channel configured to receive a first set of data vectors of the environmental signal from the receiver, each data vector, $x_1, x_2, \ldots x_n$, having a length n and an associated amplitude, and said first set of data vectors being time-dependent;
  a processing system configured to read the first set of data vectors and store first set in a memory;
  said processing system further comprising;
  a signal characterization module configured to execute instructions that, when executed, cause the processing system to select a sample size of data vectors from the first set of data vectors, said signal characterization module configured to execute instructions that, when executed, cause the processing system to determine a minimum number of lags to process to characterize the first set of data vectors based on the sample size from the first set, said signal characterization module configured to execute instructions that, when executed, cause the processing system to sum each data vector used in the cross-product term for each determined lag by a data processor to give sums, $S_1$, $S_2$, $S_3$ and $S_4$ of the calculated cross-product term wherein:

$$S_j = \sum_{i=1}^{n} x_i^j,$$

to calculate a cross-product term for each data vector in the sample size for each lag, to calculate a mean value $\mu = E(R)$ based on the data vector length n and sums, $S_1$ and $S_2$, of the cross-product term for each lag in accordance with:

$$E(R) = \frac{S_1^2 - S_2}{n - 1},$$

and
  to calculate a variance value $\sigma^2 = \text{var}(R)$ based on the sums of the cross-product term for each lag in accordance with:

$$\text{var}(R) = \frac{S_2^2 - S_4}{n - 1} + \frac{S_1^4 - 4S_1^2 S_2 + 4S_1 S_3 + S_2^2 - 2S_4}{(n-1)(n-2)} - \frac{(S_1^2 - S_2)^2}{(n-1)^2},$$

said signal characterization module configured to execute instructions that, when executed, cause the processing system to calculate a circular correlation function for each lag, said signal characterization module configured to execute instructions that, when executed, cause the processing system to determine an upper and a lower correlation bound for the circular correlation based on the mean value, the variance value, and a desired false alarm rate, and said signal characterization module configured to execute instructions that, when executed, cause the processing system to characterize the signal structure based on the number of calculated circular correlation functions that exceed the upper or lower correlation bounds so as to generate a signal characterization data signal characterizing the environmental signal as one of "signal" or "noise"; and
  a second data channel configured to receive the signal characterization data signal and output the signal characterization data signal.

16. The system of claim 15, wherein the first and second data channels are the internet.

17. The system of claim 15, wherein the processing system is a distributed processing system.

18. The system of claim 15, wherein the first set of time-dependent data vectors are indicative of a selected one of a digital signal, a finite time domain waveform, a periodic signal, a synthetic signal, and a combination of these.

19. The system of claim 15, wherein the minimum number of lags to process to characterize the first set of data vectors is at least two lags.

20. The system of claim 15, wherein the underlying distribution of the first set of data vectors is unknown.

21. The system of claim 15, wherein the first set of data vectors are indicative of a noise-corrupted signal component, wherein the noise is at least 160 percent of the signal component.

22. The system of claim 15 wherein the environmental signal is a sonar signal and the receiver is an acoustic receiver.

23. The system of claim 15 wherein the environmental signal is an electromagnetic signal and the receiver is a radio receiver.

\* \* \* \* \*